July 8, 1930.   W. C. LANDERDAHL   1,770,078
SLED
Original Filed Jan. 19, 1927
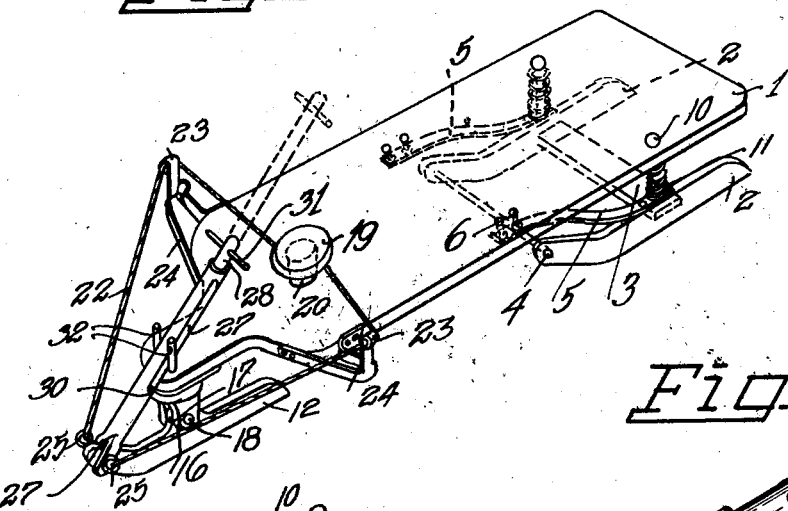
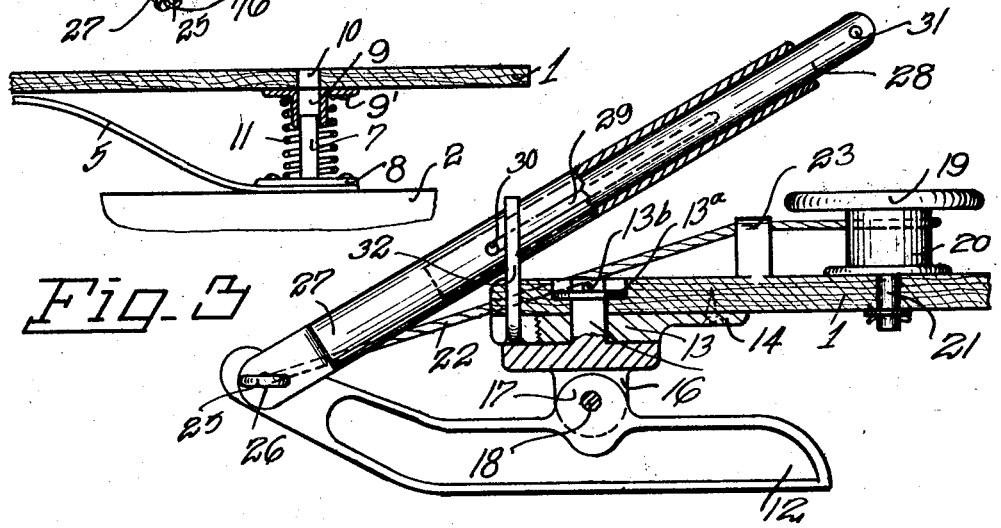
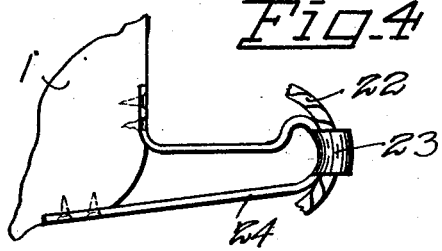
Inventor
Walter C. Landerdahl
Herbert E. Smith
By
Attorney Patented July 8, 1930

1,770,078

UNITED STATES PATENT OFFICE

WALTER C. LANDERDAHL, OF SPOKANE, WASHINGTON

SLED

Application filed January 19, 1927, Serial No. 162,039. Renewed January 4, 1930.

My present invention relates to improvements in sleds of the occupant steered type and provided with a draft attachment or handle by means of which the sled may be pulled up the coasting hill on the return trip. A single, front steering runner of the pivoted or rocking and swiveled type is utilized and steering mechanism is employed for use by the occupant in manipulating the steering runner, and of course the sled may be steered by the draft-handle when the sled is being pulled. The rear sled-member runners are provided with shock absorbing means as will be described for the purpose of absorbing movement due to irregularities encountered in the path of travel of the coasting sled, thus permitting greater speed of the sled and adding to the safety and comfort of the riders.

The invention consists in certain novel combinations and arrangement of parts for accomplishing the above purposes as will hereinafter be more fully pointed out and set forth in my appended claim.

In the accompanying drawings I have illustrated one complete example of the physical embodiment of my invention wherein the parts are combined and arranged according to the best mode I have thus far devised for the practical application of the principles of my invention.

Figure 1 is a perspective view showing a sled embodying my invention, illustrating by dotted lines the telescoping feature of the draft-handle and showing by dotted lines parts otherwise invisible.

Figure 2 is an enlarged detail sectional view at the front or steering end of the sled.

Figure 3 is a detail view of one of the spring suspensions for the rear sled.

Figure 4 is a detail plan view of one of the guide sleeve for the steering cable showing its relation to a foot brace at the front of the sled.

In carrying out my invention the usual seat-board or body 1 of the sled is utilized in suitable size and shape for the desired purpose, and the rear support for this board is made up of a pair of spaced longitudinally disposed runners 2 which are rigidly connected by a cross board 3 and a front cross bar 4. The runners 2, 2, are thus rigidly connected to form a well-braced structure, and resilient means are interposed between these runners and the underside of the body of the sled for the purpose of absorbing shocks.

The shock absorbing means includes a pair of curved leaves or flat springs 5 disposed longitudinally of the board 1 and above the runners 2 and anchored at their front ends, as at 6 to the underside of the board. The rear ends of these springs may be slotted to compensate for movement between the runners and the board and to accommodate the posts 7 that rise vertically from the base plates 8. These posts telescope in and are designed to reciprocate in guide sleeves 9 which are attached by their flanges 9' and screws or bolts to the underside of the board 1 directly above the posts, with the upper ends of the posts always projecting into the sleeves, and an opening 10 may be provided in the board for each of the pins, or posts. Each post has a spring 11 coiled about it and interposed between the flanged sleeve and the base plate of the post, and it will be apparent that the flat spring and the coiled spring at each side of the sled will appreciably absorb the shocks due to passage of the runners over irregularities in the path of travel of the sled, thus adding to the safety and comfort of the passenger or passengers.

The sled is steered by the use of a single steering runner 12 located at the front and longitudinal center line of the sled and between this runner and the seat board are provided rocking and swivel joints to insure the necessary flexibility for steering and for the smooth travel of the sled when coasting or otherwise traveling.

The swivel movement is accomplished by the use of a king bolt 13 secured at its upper end by a washer 13$^a$ and cotter pin 13$^b$ above the top surface of the seat board. The pin passes through an opening in the seat board and the latter is countersunk to properly locate the washer and cotter-pin. Beneath the seat board a perforated guide plate 14 for the king bolt is secured and the latter has an enlarged, flat head 15 for frictional contact with the underface of this guide plate as the runner is steered or turned. The rocking movement of the sled in a vertical plane is accomplished by the use of a pair of perforated ears 16 integral with the head 15 and these lugs straddle the complementary perforated lug 17 that projects upwardly from the upper edge of the runner 12. A pivot pin 18 is passed through these ears and lug to form the center of the rocking movement at the steering or front end of the sled.

For use by the occupant in steering the sleed when coasting, I provide a hand wheel 19 having a drum 20 located above the seat board and rotatable in a bearing opening in the seat board with the bearing pin or shaft 21 as a center. A cable 22 is given a couple of turns around the drum and its ends extend therefrom laterally and pass through guide sleeves 23 supported at the outer ends of foot braces 24. The foot braces are attached to the opposite sides of the seat board in position for convenient use by the person steering the sled and these sleeves on the foot braces thus guide the cable ends out of the way of the steersman. From the guide sleeves the cable ends pass to eyes or loops 25 at the ends of the handle pivot pin 26 which passes through the front perforated end of the steering runner. Thus by turning the wheel in usual manner the sled may be steered by the occupant while coasting.

As a draft attachment for use in returning the sled up the coasting hill or for other use, I use a telescoping handle attached to the runner by the pin 26. As seen in Figures 1 and 2 this telescopic handle may be retracted to short length to be out of the way when the steering wheel is used for coasting, but it may readily be extended when desired for use in pulling the sled. The telescopic handle comprises a forked, tubular section 27 and a slidable upper section 28, the former having a longitudinally extending guide slot 29 and the latter having a guide pin 30 in this slot, for use when the section 28 is being slid into or out of its tubular member 27. For convenience in manipulating the handle, a cross pin 31 may be provided at the end of the bar 28.

In addition to its use in pulling the sled, the telescopic handle is adapted when desirable or necessary, for alternate use with the hand wheel in steering the sled. For this purpose a pair of pins 32 are provided at the front of the seat board and the telescoping handle as shown in Figures 1 and 2 passes between these pins when it is in position for steering by the occupant, when the hand wheel is used. These pins are preferably the prongs of a U-shaped bolt that is securely and firmly fixed at the front of the seat board, and it will be apparent that the telescopic handle may be swung laterally of the sled to steer it, using the pins as fulcrums for this movement.

Having thus fully described my invention, what I claim as new and desire to secure by Letters Patent is—

The combination with a seat board, of a front single steering runner having a rocking pivot and a swivel pivot in connection with the seat board, a sectional telescopic handle pivoted at the front end of said runner, and spaced pins on the seat board to function as a fulcrum for said handle when steering.

In testimony whereof I affix my signature.

WALTER C. LANDERDAHL.